Patented Dec. 5, 1922.

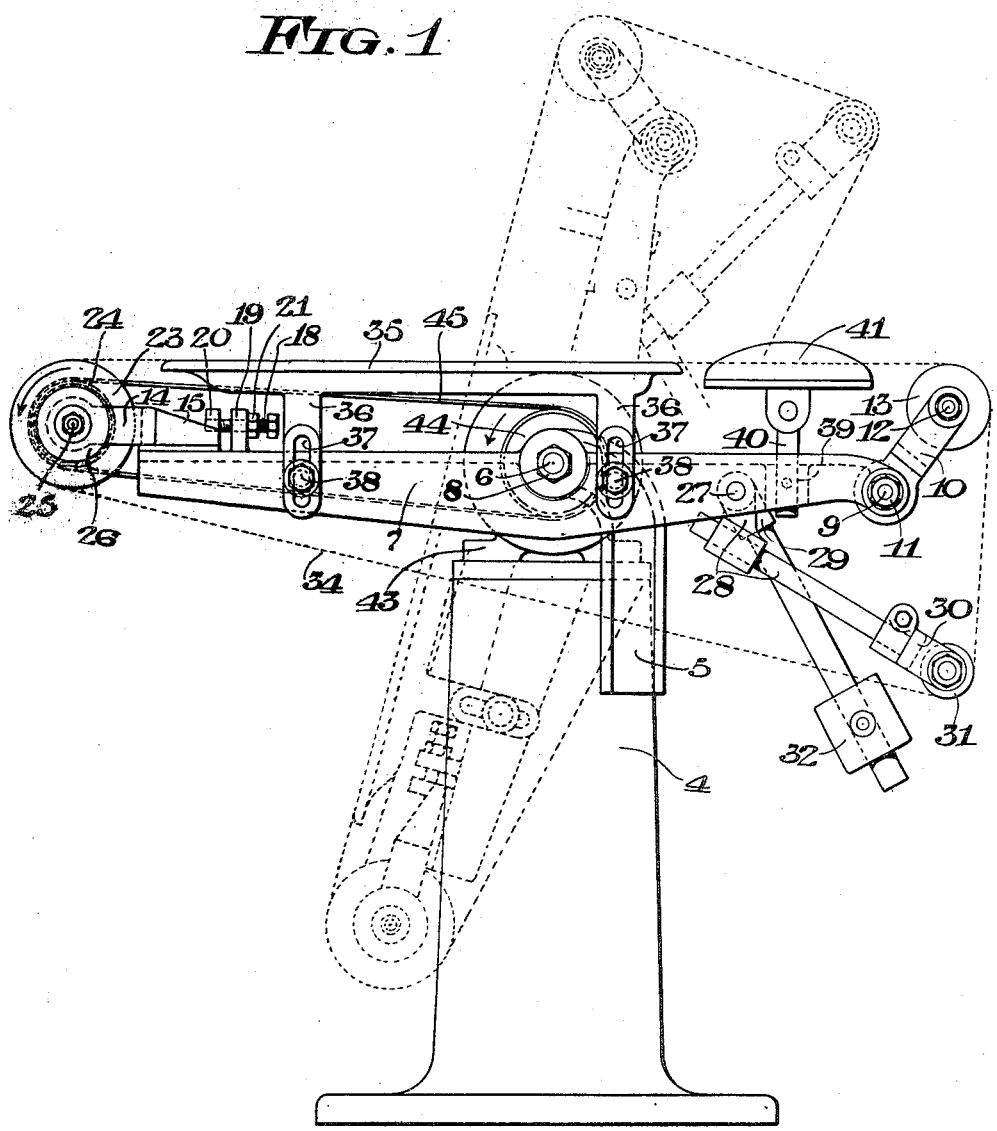

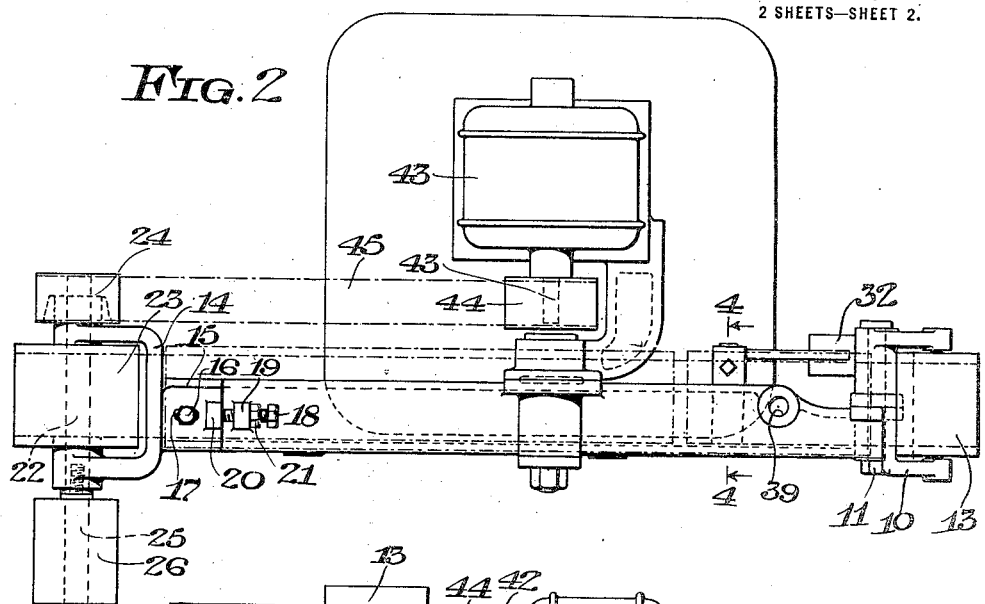

1,437,414

UNITED STATES PATENT OFFICE.

RICHARD E. GRUENHAGEN, OF OSHKOSH, WISCONSIN.

SANDING MACHINE.

Application filed June 13, 1921. Serial No. 477,213.

*To all whom it may concern:*

Be it known that I, RICHARD E. GRUEN-HAGEN, a citizen of the United States, and resident of Oshkosh, in the county of Winnebago and State of Wisconsin, have invented new and useful Improvements in Sanding Machines, of which the following is a description, reference being had to the accompanying drawings, which are a part of this specification.

The invention relates to belt sanders.

One object of the invention is to provide a simple, light weight, compact and efficient sander adapted for a great variety of uses, and especially one which is driven by an electric motor mounted on the supporting pedestal for the machine so as to form a self-contained unit and eliminate the large pulleys and counter-shaft drive usually employed.

A further object of the invention is to provide a machine of this character in which the driven shaft for the sand belt has a spindle for receiving sanding rolls so that both the belt and roll may be driven by a single belt connection with a suitable source of power.

The invention further consists in the several features hereinafter set forth and more particularly defined by claims at the conclusion hereof.

In the drawings: Fig. 1 is an elevation view of a sanding machine embodying the invention; Fig. 2 is a plan view thereof; Fig. 3 is a front end view of the machine; Fig. 4 is a section taken on the line 4—4 of Fig. 2.

A bracket 5 may be connected to or formed integral with a standard 4 and is provided with a pivot shaft 6 upon which a frame 7 is mounted to tilt from a horizontal to a vertical position, a clamping nut 8 being used to hold the frame in different positions relative to the standard 4.

A bolt 9 passes through one end of the frame 7 and carries a yoke 10 which is clamped to said frame by the bolt 9 and a nut 11, the arms of said yoke having pivots 12 upon which a pulley 13 is free to rotate.

A bearing yoke 14 has its base 15 secured to the other end of the frame 7 by a bolt 16 passing through a slot 17 in said base and may be moved for adjustment of the yoke by means of a screw 18 passing through a lug 19 on the frame and into a lug 20 on the base 15, a lock nut 21 securing said screw in adjusted position. A shaft 22 is journalled in the arms of the yoke 14 and carries a pulley 23 between the arms of the yoke, a pulley 24 at one end, and its other end 25 forms a spindle upon which a sanding roll 26 may be mounted and secured.

A stud shaft 27 is provided on the frame between its turning pivot and the end carrying the pulley 13 and upon this shaft is journalled a sleeve 27' having arms 28 and 29 secured thereto, as by set screws 28' and 29'. The arm 28 carries a yoke 30 and a pulley 31 is rotatably carried in the arms of this yoke. The arm 29 has a tensioning weight 32 adjustably mounted thereon. The sanding belt 34 runs over the pulleys 13, 23 and 31 and is driven from the shaft 22. The arm 29 may be angularly adjusted with respect to the arm 28 by means of the set screw 29' so that this weighted arm will exert the same amount of tension on the belt 34 through the arm 28, yoke 30 and pulley 31 in whatever position the frame 7 may be.

A platen 35 over which the belt 34 passes is provided with uprights 36 having slots 37 therein through which bolts 38 pass to adjustably clamp the platen to the frame 7. An opening 39 is provided in the frame 7 receiving the spindle 40 of a cushion 41 having a curved face over which the sand belt 34 may pass. The platen 35 is used as a backing for straight surface sanding, while the cushion 41 may be used as a backing for curved surface work, as also the roll 26.

A drive shaft 42, preferably that of an electric motor 43 mounted on the top of the standard 4, carries a pulley 44 and a driving belt 45 operatively connects this pulley with the pulley 24. The shaft 42 has its axis alined with that of the shaft 6 so that the belt 45 will function in any position of the frame 7. This arrangement for the drive also has the advantage of maintaining the pulleys 13, 23 and 31 in the same relation to the belt 34 in any position of the frame 7. The frame 7 is disposed in front of the shaft 42 on the offset arm of the standard formed by the bracket 5. The belt 45 may be tightened by adjusting the position of the yoke 14 with respect to the frame 7. The use of a motor drive as above described provides a self-contained unit that may be installed in any convenient location without taking up much space, and eliminates the use of large pulleys and counter-shaft drive usually employed. Where it is not desired or possible to use a motor drive the shaft 42 may be provided with a pulley driven from any suitable source of power, as will be readily understood by those familiar with this art.

As indicated by full and dotted line positions in Fig. 1, the belt and its supports may be swung to different positions to suit the requirements of the work being done.

What I claim as my invention is:

1. In a sanding machine, the combination of a standard provided with a stationary pivot, a pulley-supporting frame mounted on said pivot, means on said pivot for clamping said frame to said standard, pulleys carried by said frame, a sanding belt running over said pulleys, one of said pulleys being mounted on a shaft carrying a power pulley, a drive shaft supported by said standard and having its axis alined with the pivot axis of said frame and carrying a power pulley, and a belt connecting said power pulleys.

2. In a sanding machine, the combination of a standard, an electric motor mounted on the top of said standard, said standard having an offset arm projecting above its top and provided with a stationary pivot, a pulley-supporting frame mounted on said pivot in front of said arm, a clamping nut on the outer end of said pivot for securing said frame in adjusted position, pulleys carried by said frame, a sanding belt running over said pulleys, one of said pulleys being mounted on a shaft carrying a power pulley, said motor having a shaft alined with the pivot axis of said frame and carrying a power pulley, and a belt connecting said power pulleys together.

In testimony whereof, I affix my signature, in presence of two witnesses.

RICHARD E. GRUENHAGEN.

Witnesses:
R. P. BOARDMAN,
E. S. OSTERTAG.